(12) United States Patent
Zhou

(10) Patent No.: US 6,999,931 B2
(45) Date of Patent: Feb. 14, 2006

(54) SPOKEN DIALOG SYSTEM USING A BEST-FIT LANGUAGE MODEL AND BEST-FIT GRAMMAR

(75) Inventor: Guojun Zhou, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 701 days.

(21) Appl. No.: 10/061,398

(22) Filed: Feb. 1, 2002

(65) Prior Publication Data

US 2003/0149561 A1   Aug. 7, 2003

(51) Int. Cl.
*G10L 15/00* (2006.01)
(52) U.S. Cl. ...................... 704/275; 704/251
(58) Field of Classification Search ........... 704/251, 704/275
See application file for complete search history.

(56) References Cited

U.S. PATENT DOCUMENTS 5,384,892 A * 1/1995 Strong ................. 704/243
5,615,296 A * 3/1997 Stanford et al. ......... 704/270.1
6,374,226 B1 * 4/2002 Hunt et al. ................. 704/275
6,418,440 B1 * 7/2002 Kuo et al. .................. 707/10

* cited by examiner

Primary Examiner—Daniel Abebe
(74) Attorney, Agent, or Firm—Blakely, Sokoloff, Taylor & Zafman LLP

(57) ABSTRACT

A spoken dialog system using a best-fit language model and a spoken dialog system using best-fit grammar are disclosed. A spoken dialog system implementing both a best-fit language model and best-fit grammar is further disclosed. Regarding the language model, likelihood scores from a large vocabulary continuous speech recognition ("LVCSR") module are used to select the best-fit language model among a general task language model and dialog-state dependent language models. Based on the chosen language model, a dialog manager can implement different strategies to improve general dialog performance and recognition accuracy. Regarding grammar, the best-fit grammar method improves performance and user experience of dialog systems by choosing the best-fit grammar among a general purpose grammar and dialog-state dependent sub-grammars. Based on the selected grammar pattern, the dialog system can choose from varying dialog strategies, resulting in an increase in user acceptance of spoken dialog systems.

39 Claims, 3 Drawing Sheets

SPOKEN DIALOG SYSTEM USING A BEST-FIT LANGUAGE MODEL AND BEST-FIT GRAMMAR

BACKGROUND

1. Field of the Invention

Embodiments described herein are directed to a spoken dialog system using a best-fit language model and best-fit grammar. Specifically, the dialog system selects both a best-fit language model among a general-task language model and numerous dialog-state dependent language models and a best-fit grammar among a general-purpose grammar and numerous dialog-state dependent sub-grammars.

2. Related Art

A large vocabulary continuous speech recognizer ("LVCSR") is a key component of a spoken dialog system. A LVCSR's performance directly affects dialog system performance. Almost all LVCSR systems use language models ("LM") to improve recognition accuracy. LMs for continuous speech recognition are usually built from a large set of training sentences in a specific domain. Current LVCSRs in spoken dialog systems typically use a single LM, which covers a general task. The most commonly used LM is the statistical LM ("SLM"), i.e., n-grams.

The n-gram represents basic probabilities of occurrences of n-word sequences. N-grams are task dependent and can be instrumental in improving recognition accuracy. The standard n-gram LM captures the structure of a spoken language by assigning probabilities to words conditioned on n−1 preceding words. The value of n is usually kept low (two or three), since the number of parameters increases exponentially with n, and the training data is sparse in the early phases of system development. Thus, standard n-gram LMs do not model longer distance correlations. They also do not take advantage of linguistic knowledge or structure other than that covered within n-word sequences.

The single LM method does not employ dialog-state dependent LMs to improve recognition accuracy. That is, language modeling for speech recognizer in dialog systems may take one of several forms. Human input can be constrained through a directed dialog, allowing a decoder to use a state-specific LM to improve recognition accuracy. In this way, dialog states are used to partition a whole set of utterances into subsets and then train standard n-gram LMs from each partitioned set. Recent research articles have reported a use of dialog-state dependent LMs for dialog systems. Yet, there lacks a way to prevent these dialog-state dependent LMs from over-specializing such that user utterances that are not categorized into the current state are penalized.

As such, a new method that uses likelihood scores from the LVCSR to select the best-fit LM among a general-task LM and the dialog-state dependent LMs is needed. This new method takes advantage of dialog-state dependent LMs to improve recognition accuracy and, at the same time, to avoid the over-specialization of LMs by using the general-task LM.

Most spoken dialog systems further use grammar to improve their performance. Grammar can be used by either the speech recognition engine or the parser, the language understanding module. The grammar specifies the phrase/sentence patterns that are allowed to pass the recognition engine or the parser. While a grammar that consists of a limited number of patterns can be written relatively easily, such a grammar only allows a user to speak in a limited number of ways. Such a deficiency may result in a disappointing user experience. Writing a grammar that includes all possible spoken patterns by all possible users is nearly impossible, however. In addition, a complex grammar would be more likely to generate ambiguities, i.e., one user input may match multiple grammar patterns, which may have different understandings of the user input.

Current spoken dialog systems typically use a single grammar. Several problems are related to such use. First, it is difficult for a single grammar to cover all utterance patterns, even for moderate tasks. The complexity makes the grammar writing time consuming and tedious. Moreover, if the grammar does not cover a sufficient number of utterance patterns, the probability of the user being rejected increases, despite a correct query/response. Second, the likelihood that the same user utterance will be matched with multiple patterns in a grammar increases as complexity increases, causing problems and ambiguities. Third, every grammar task is dependent and thus not portable across different tasks. That is, a new grammar must be written for each new task.

A best-fit grammar strategy to improve the performance and user experience of dialog systems and make grammar writing less complex is thus needed to solve the above-described problems. Allowing a dialog system to choose the best-fit grammar from a general-purpose grammar and dialog-state dependent sub-grammars will prove beneficial.

BRIEF DESCRIPTION OF THE DRAWINGS

A detailed description of embodiments of the invention will be made with reference to the accompanying drawings, wherein like numerals designate corresponding parts in the several figures.

DETAILED DESCRIPTION

The following paragraphs describe a spoken dialog system 100 using a best-fit language model and best-fit grammar. A task that a dialog system performs is typically too general for a single statistical language model ("SLM"). For example, the probability of word-one ("$W_1$") followed by word-two ("$W_2$"), as represented by $P(W_2|W_1)$, for the task in general may be significantly different than $P(W_2|W_1)$ under different dialog states of the same task. Thus, some dialog systems use a dialog-state dependent language model ("LM") to improve performance. Using only dialog-state dependent LMs, however, can result in unanticipated errors, especially when a user poses general questions at a specific dialog state.

Figure 1:
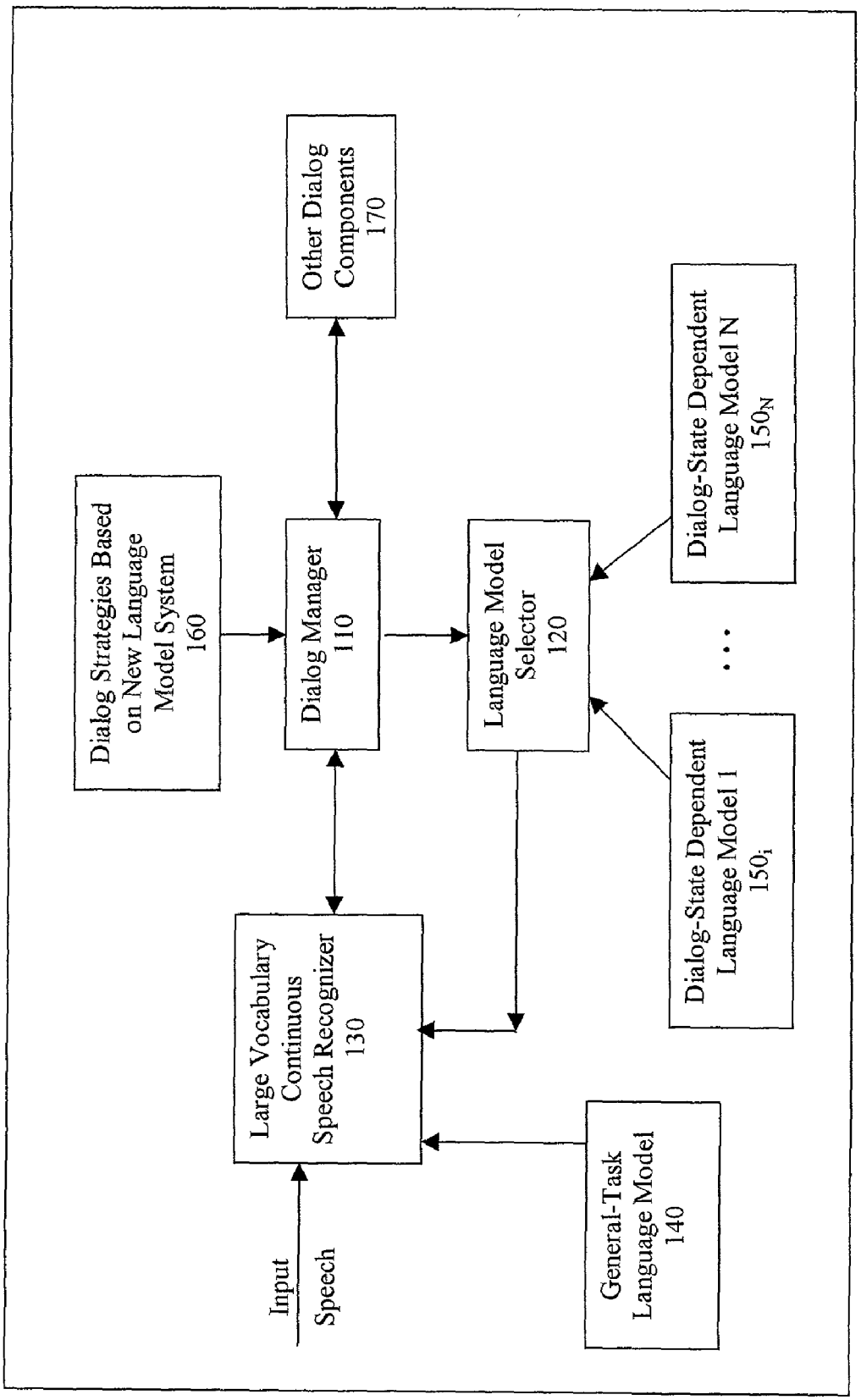
FIG. 1 is a diagram of the components of a spoken dialog system implementing a best-fit language model, according to an embodiment of the present invention.

FIG. 1 shows a spoken dialog system 100 implementing a best-fit language model. The main components of the spoken dialog system 100 are a general-task LM 140, dialog-state dependent LMs 150$_{i-N}$, an LM selector 120, and dialog strategies 160 based on the new LM system.

A dialog manager 110 is the central controlling component of the spoken dialog system 100. The dialog manager 110 provides to the LM selector 120 the current dialog state. Because a user's response depends on what is heard by the user, state may be defined as preceding system prompt, i.e., the natural language generation frame. Users' utterances are thus classified into states.

Based on the current dialog state, the LM selector 120 selects a dialog-state dependent LM $150_{i\text{-}N}$. A dialog-state dependent LM is linearly interpolated with the general-task LM 140. The general-task LM 140 is built from the entire body of available data. Based on the chosen dialog-state dependent LM $150_{i\text{-}N}$, a Large Vocabulary Continuous Speech Recognizer ("LVCSR") 130 generates a first hypothesis result for the input speech with a likelihood score. The general-task LM 140 is also used for the LVCSR 130 to generate a second hypothesis with a second likelihood score. The end result is chosen from the hypothesis that has the higher likelihood score.

Based on whether the general-task LM 140 or the dialog-state dependent LM $150_{i\text{-}N}$ is implemented, the dialog manager 110 deploys the appropriate and corresponding dialog strategies 160 to improve dialog performance. For instance, an automatic mechanism for guiding a user via non-directive prompts or system suggestions may be used. The aim of a tourist information retrieval system may be viewed as providing a user with information that will allow him or her to make a decision. From this point of view, a dialog strategy 160 should serve to keep the user within the boundaries of the system as well as to help the user discover the various possibilities of the system and the contents of its database. Such a dialog strategy 160 is more open than typically needed for simple train timetable retrieval in that the user does not necessarily have a deductive idea of what the system is able to provide.

Another example of a dialog strategy 160 is that when the result stems from the general-task LM 140 rather than the dialog-state dependent LM $150_{i\text{-}N}$, at that dialog state the dialog manager 110 is prompted to confirm with the user before continuing with the next step. This method helps improve recognition accuracy as well as dialog performance. In addition, the dialog manager 110 also deploys various other dialog components 170 to improve dialog performance. Dialog components 170 may be more or less sophisticated based on whether the user is a novice who mostly follows the prompts of the system or whether the user is experienced and would benefit less from suggestive prompts.

The spoken dialog system 100 implementing a best-fit LM can be incorporated into any voice dialog systems such as voice portals and voice-enabled services, e.g., travel reservation systems. The best-fit LM spoken dialog system 100 will likely enhance user experience and increase user acceptance of voice dialog systems.

A best-fit grammar strategy to improve performance and user experience of dialog systems, and at the same time, to make grammar writing less complex and tedious is also disclosed.

Figure 2:
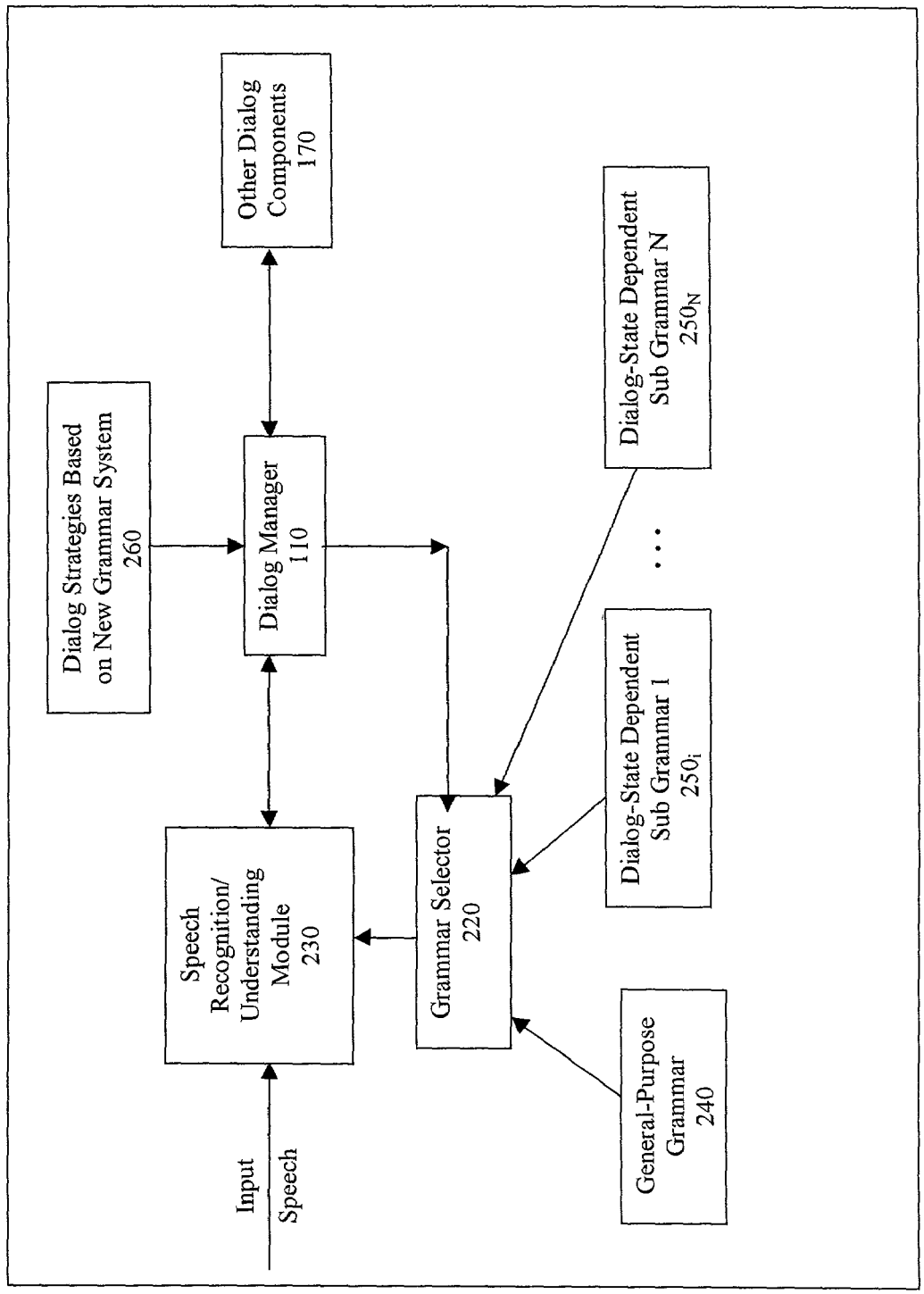
FIG. 2 is a diagram of the components of a spoken dialog system implementing a best-fit grammar strategy, according to an embodiment of the present invention.

FIG. 2 shows the main components of a spoken dialog system 200 implementing a best-fit grammar strategy. The main components of the spoken dialog system 200 are a general-purpose grammar 240, dialog-state dependent sub-grammars $250_{i\text{-}N}$, a grammar selector 220, and dialog strategies 260 based on the new grammar system.

A dialog manager 110 is the central controlling component of the spoken dialog system 200. A speech recognition/understanding module 230 receives input speech. The dialog manager 110 provides to the grammar selector 220 the current dialog state. Based on the current dialog state, the grammar selector 220 selects a dialog-state dependent sub-grammar $250_{i\text{-}N}$, e.g. waiting for a credit card number from a user. If this dialog-state dependent sub-grammar $250_{i\text{-}N}$ cannot provide a matching pattern to the input speech, the dialog manager 110 asks the grammar selector 220 to use the general-purpose grammar 240.

For instance, a user may ask, "How can I go back to the third step?" while the spoken dialog system 200 is already in the sixth step of collecting the credit card number. Once the dialog-state dependent sub-grammar $250_{i\text{-}N}$ fails to provide a matching pattern to the input utterance, the spoken dialog system 200 reverts to the general-purpose grammar 240, which contains patterns of general user responses, to continue the dialog. Because of the presence of dialog-state dependent sub-grammars $250_{i\text{-}N}$, the general-purpose grammar 240 does not need to be as complex as a single grammar.

Under the above-described method, each dialog-state dependent sub-grammar $250_{i\text{-}N}$ can be specific to one or a few well-defined sub-tasks yet contain as many patterns as possible. At the same time, the general-purpose grammar 240 can be less complex, since it only needs to cover the phrase/sentence patterns for general user response that are not covered by the dialog-state dependent sub-grammars $250_{i\text{-}N}$.

Based on which grammar is employed, the dialog-state dependent sub-grammar $250_{i\text{-}N}$ or the general-purpose grammar 240, the dialog manager 110 deploys the appropriate and corresponding dialog strategies 260 accordingly. For example, if the dialog-state dependent sub-grammar $250_{i\text{-}N}$ is used, the dialog manager 110 may continue to collect information. If the general-purpose grammar 240 is used, however, the dialog manager 110 may need to provide further confirmation and/or navigation. The dialog manager 110 further deploys various other dialog components 170 to improve dialog performance.

Each dialog-state dependent sub-grammar $250_{i\text{-}N}$ deals only with a limited number of subtasks such as querying a user for a credit card number, thereby allowing a less complex sub-grammar that includes relatively complete patterns to be written. As such, a user is less likely to be rejected despite not being an experienced user, and the possibility of causing ambiguities is reduced. In addition, such sub-grammars $250_{i\text{-}N}$ can be reused across different tasks. Eventually, a new task can choose different sub-grammars $250_{i\text{-}N}$ from a sub-grammar library after several tasks have been completed.

The spoken dialog system 200 implementing a best-fit grammar strategy can be incorporated into any voice dialog systems such as voice portals and voice-enabled services, e.g., travel reservation systems. The best-fit grammar spoken dialog system 200 will likely enhance user experience and increase user acceptance of voice dialog systems.

Figure 3:
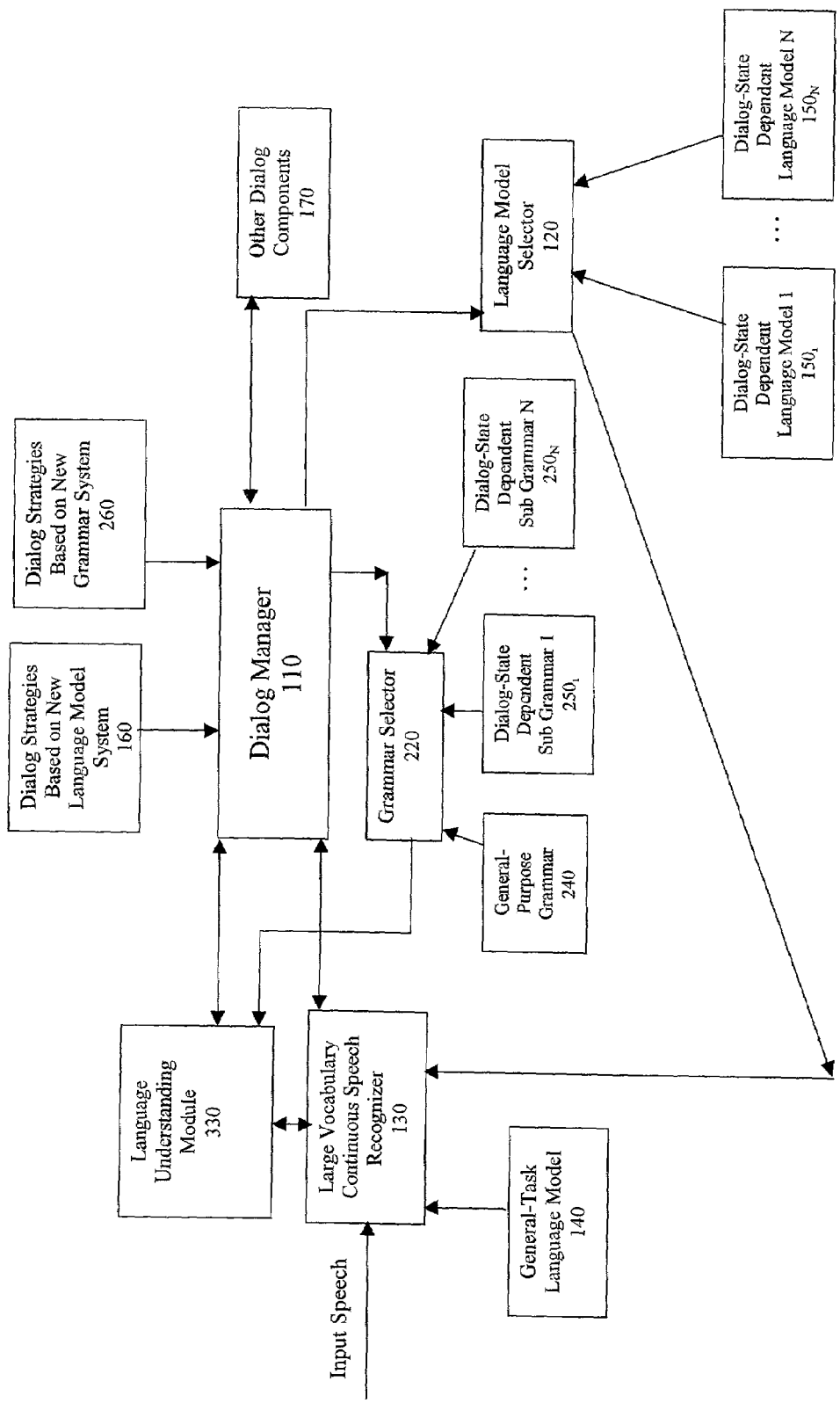
FIG. 3 is a diagram of the components of a spoken dialog system implementing a best-fit language model and a best-fit grammar strategy, according to an embodiment of the present invention.

FIG. 3 shows a spoken dialog system 300 implementing both a best-fit language model and best-fit grammar. A dialog manager 110 is the central controlling component of the spoken dialog system 300. The dialog manager 110 provides the current dialog state to both the LM selector 120 and the grammar selector 220. Based on the current state, the LM selector 120 selects a dialog-state dependent LM $150_{i\text{-}N}$. A dialog-state dependent LM is linearly interpolated with the general-task LM 140. The general-task LM 140 is built from the entire body of available data. Based on the chosen dialog-state dependent LM $150_{i\text{-}N}$, an LVCSR 130, which receives input speech, generates a first hypothesis result for the input speech with a likelihood score. The general-task LM 140 is also used for the LVCSR 130 to generate a second hypothesis with a second likelihood score. The end result is chosen from the hypothesis that has the higher likelihood score.

Based on whether the general-task LM 140 or the dialog-state dependent LM $150_{i-N}$ is implemented, the dialog manager 110 deploys the appropriate and corresponding dialog strategies 160 to improve dialog performance. In addition, the dialog manager 110 also deploys various other dialog components 170 to improve dialog performance. Dialog components 170 may be more or less sophisticated based on whether the user is a novice who mostly follows the prompts of the system or whether the user is experienced and would benefit less from suggestive prompts.

Based on the current dialog state, the grammar selector 220 selects a dialog-state dependent sub-grammar $250_{i-N}$. If this dialog-state dependent sub-grammar $250_{i-N}$ cannot provide a matching pattern to the input speech, the dialog manager 110 asks the grammar selector 220 to use the general-purpose grammar 240. A language understanding module 330 communicates with the dialog manager 110 and the LVCSR 130. That is, a word sequence is submitted to the language understanding module 330 which then extracts the integral information such that what the user means is understood by the spoken language system 300, and a desired action may then be performed. The recognized word sequence may be passed to the language understanding module through the dialog manager 110 or via the LVCSR 130 directly.

Each dialog-state dependent sub-grammar $250_{i-N}$ can be specific to one or a few well-defined sub-tasks yet contain as many patterns as possible. At the same time, the general-purpose grammar 240 can be less complex, since it only needs to cover the phrase/sentence patterns for general user response that are not covered by the dialog-state dependent sub-grammars $250_{i-N}$. Based on which grammar is employed, the dialog-state dependent sub-grammar $250_{i-N}$ or the general-purpose grammar 240, the dialog manager 110 deploys the appropriate and corresponding dialog strategies 260 accordingly. The dialog manager 110 further deploys various other dialog components 170 to improve dialog performance. The spoken dialog system 300 will likely enhance user experience and performance and increase user acceptance of voice dialog systems as well as make writing grammar less complex and tedious.

Various combinations of the spoken dialog system 100 implementing a best-fit language model and the spoken dialog system 200 implementing best-fit grammar may occur. That is, a best-fit language model may be used with a single grammar. Best-fit grammar may similarly be used with a single language model. For voice dialog systems that solely use a speech recognizer with no understanding module, either a language model or grammar will be accepted.

While the above description refers to particular embodiments of the present invention, it will be understood to those of ordinary skill in the art that modifications may be made without departing from the spirit thereof The accompanying claims are intended to cover any such modifications as would fall within the true scope and spirit of the present invention.

The presently disclosed embodiments are therefore to be considered in all respects as illustrative and not restrictive; the scope of the invention being indicated by the appended claims, rather than the foregoing description. All changes that come within the meaning and range of equivalency of the claims are therefore intended to be embraced therein.

What is claimed is:

1. A spoken dialog system using a best-fit language model, comprising:

a dialog manager, coupled to a language model selector, that provides to the language model selector a current dialog state;

the language model selector, coupled to a plurality of dialog-state dependent language models, that selects one of the plurality of dialog-state dependent language models;

the plurality of dialog-state dependent language models that are interpolated from a general-task language model;

a large vocabulary continuous speech recognizer, coupled to the dialog manager and the language model selector, that receives input speech and generates a first hypothesis result for the input speech with a likelihood score, based on the selected dialog-state dependent language model;

the general-task language model, coupled to the large vocabulary continuous speech recognizer, that enables the large vocabulary continuous speech recognizer to generate a second hypothesis with a second likelihood score; and a plurality of dialog strategies based on the language model system, coupled to the dialog manager.

2. The spoken dialog system of claim 1, wherein the language model selector selects one of the plurality of dialog-state dependent language models based on the current dialog state.

3. The spoken dialog system of claim 1, wherein an end result is chosen from the higher value of the first likelihood score and the second likelihood score.

4. The spoken dialog system of claim 1, wherein the dialog manager deploys a plurality of various dialog components to improve dialog performance.

5. A spoken dialog system using best-fit grammar, comprising:

a dialog manager, coupled to a grammar selector, that provides to the grammar selector a dialog state, the dialog state being dependent upon a user's utterances;

the grammar selector, coupled to a plurality of dialog-state dependent sub-grammars, that selects one of the plurality of dialog-state dependent sub-grammars;

the plurality of dialog-state dependent sub-grammars, that contain a plurality of speech patterns;

a speech recognition module, coupled to the dialog manager and the grammar selector, that receives input speech;

a general-purpose grammar, coupled to the grammar selector, that contains patterns of general user responses; and a plurality of dialog strategies based on the selected grammar system, coupled to the dialog manager, to enhance dialog performance.

6. The spoken dialog system of claim 5, wherein the grammar selector chooses one of the plurality of dialog-state dependent sub-grammars based on the current dialog state.

7. The spoken dialog system of claim 5, wherein the dialog manager commands the grammar selector to use the general-purpose grammar, if the selected dialog-state dependent sub-grammar fails to provide a matching pattern to the input speech.

8. The spoken dialog system of claim 5, wherein each of the plurality of dialog-state dependent sub-grammars is specific to at least one of a defined sub-task.

9. The spoken dialog system of claim 5, wherein a speech understanding module, coupled to the dialog manager and the grammar selector, receives a word sequence generated by the speech recognition module.

10. The spoken dialog system of claim 5, wherein the dialog manager deploys a plurality of various dialog components to improve dialog performance.

11. A spoken dialog system implementing a best-fit language model, comprising a computer readable medium and a computer readable program code stored on the computer readable medium having instructions to:
receive a current dialog state from a dialog manager;
select a dialog-state dependent language model from a plurality of dialog-state dependent language models based on the current dialog state;
generate a first hypothesis result for input speech with a first likelihood score;
generate a second hypothesis result for input speech with a second likelihood score;
select a best-fit language model from the higher value of the first likelihood score and the second likelihood score; and
implement dialog strategies, based on the best-fit language model, to improve dialog performance.

12. The spoken dialog system of claim 11, wherein the instructions are provided to a language model selector to select the dialog-state dependent language model.

13. The system of claim 12, wherein the instructions are provided to a large vocabulary continuous speech recognizer to receive input speech and generate the first hypothesis result based on the selected dialog-state dependent language model.

14. The system of claim 13, wherein the instructions are provided to the large vocabulary continuous speech recognizer from a general-task language model to generate the second hypothesis result.

15. The system of claim 11, wherein the instructions are provided to the dialog manager to implement at least one of a plurality of dialog strategies to further improve accuracy and enhance dialog performance.

16. A spoken dialog system implementing best-fit grammar, comprising a computer readable medium and a computer readable program code stored on the computer readable medium having instructions to:
receive a dialog state from a dialog manager, the dialog state being dependent upon a user's utterances;
select one of a plurality of dialog-state dependent sub-grammars based on the current dialog state;
select a general-purpose grammar, if the chosen dialog-state dependent sub-grammar fails to provide a matching pattern of input speech; and
implement dialog strategies, based on one of the dialog-state dependent sub-grammar and the general-purpose grammar, to improve dialog performance.

17. The spoken dialog system of claim 16, wherein the instructions are provided to a grammar selector to select one of the plurality of dialog-state dependent sub-grammars.

18. The spoken dialog system of claim 16, wherein the instructions are provided from the dialog manager to the grammar selector to select the general-purpose grammar that contains patterns of general user responses.

19. The spoken dialog system of claim 16, wherein each of the plurality of dialog-state dependent sub-grammars is specific to at least one defined task.

20. The system of claim 16, wherein the instructions are provided to the dialog manager to implement at least one of a plurality of dialog strategies to further improve accuracy and enhance dialog performance.

21. A method of implementing a best-fit language model in a spoken dialog system, comprising:
receiving a current dialog state from a dialog manager;
choosing a dialog-state dependent language model from a plurality of dialog-state dependent language models based on the current dialog state;
calculating a first hypothesis result for input speech with a first likelihood score;
calculating a second hypothesis result for input speech with a second likelihood score;
choosing a best-fit language model from the higher value of the first likelihood score and the second likelihood score; and
deploying dialog strategies, based on the best-fit language model, to improve dialog performance.

22. The method of claim 21, wherein a language model selector chooses the dialog-state dependent language model.

23. The method of claim 21, wherein a large vocabulary continuous speech recognizer receives input speech and calculates the first hypothesis result based on the selected dialog-state dependent language model and calculates the second hypothesis result from input speech from a general-task language model.

24. The method of claim 23, wherein an end result is selected from the greater value of the first likelihood score and the second likelihood score.

25. A method of implementing a best-fit grammar model in a spoken dialog system, comprising:
receiving a current dialog state from a dialog manager, the current dialog state being dependent upon a user's utterances;
choosing one of a plurality of dialog-state dependent sub-grammars based on the current dialog state;
choosing a general-purpose grammar, if the chosen dialog-state dependent sub-grammar fails to provide a matching pattern of input speech; and
employing dialog strategies, based on one of the dialog-state dependent sub-grammar and the general-purpose grammar, to improve dialog performance.

26. The method of claim 25, wherein a grammar selector chooses one of the plurality of dialog-state dependent sub-grammars.

27. The method of claim 25, wherein the grammar selector chooses the general-purpose grammar that contains patterns of general speech.

28. The method of claim 25, wherein the dialog manager employs at least one of a plurality of dialog strategies to further enhance dialog performance and improve recognition accuracy.

29. A spoken dialog system using a best-fit language model and best-fit grammar, comprising:
a dialog manager, coupled to a language model selector and a grammar selector, that provides to the language model selector and to the grammar selector a current dialog state;
the language model selector, coupled to a plurality of dialog-state dependent language models, that selects one of the plurality of dialog-state dependent language models;
the grammar selector, coupled to a plurality of dialog-state dependent sub-grammars, that contain a plurality of speech patterns;
the plurality of dialog-state dependent language models that are interpolated from a general-task language model;
the plurality of dialog-state dependent sub-grammars that contain a plurality of speech patterns;
a large vocabulary continuous speech recognizer, coupled to the dialog manager and the language model selector and a language understanding module, that receives input speech and generates a first hypothesis result for the input speech with a likelihood score, based on the selected dialog-state dependent language model;

the language understanding module, coupled to the dialog manager and to the grammar selector and to large vocabulary continuous speech recognizer, that extracts critical information from a word sequence generated by the large vocabulary continuous speech recognizer;

the general-task language model, coupled to the large vocabulary continuous speech recognizer, that enables the large vocabulary continuous speech recognizer to generate a second hypothesis with a second likelihood score;

a general-purpose grammar, coupled to the grammar selector, that contains patterns of general user responses; and a plurality of dialog strategies based on the language model system and a plurality of dialog strategies based on the selected grammar system, coupled to the dialog manager.

30. The spoken dialog system of claim 29, wherein an end result is chosen from the higher value of the first likelihood score and the second likelihood score.

31. The spoken dialog system of claim 29, wherein the dialog manager commands the grammar selector to use the general-purpose grammar, if the selected dialog-state dependent sub-grammar fails to provide a matching pattern to the input speech.

32. A spoken dialog system implementing a best-fit language model and best-fit grammar, comprising a computer readable medium and a computer readable program code stored on the computer readable medium having instructions to:

receive a current dialog state from a dialog manager;

select a dialog-state dependent language model from a plurality of dialog-state dependent language models based on the current dialog state;

select a dialog-state dependent sub-grammar from a plurality of dialog-state dependent sub-grammars based on the current dialog state;

select a general-purpose grammar, if the chosen dialog-state dependent sub-grammar fails to provide a matching pattern of input speech;

generate a first hypothesis result for input speech with a first likelihood score;

generate a second hypothesis result for input speech with a second likelihood score;

select a best-fit language model from the higher value of the first likelihood score and the second likelihood score; and implement dialog strategies, based on the best-fit language model and based on one of the dialog-state dependent sub-grammar and the general-purpose grammar.

33. The spoken dialog system of claim 32, wherein the instructions are provided to a language model selector to select the dialog-state dependent language model.

34. The system of claim 33, wherein the instructions are provided to a large vocabulary continuous speech recognizer to receive input speech and generate the first hypothesis result based on the selected dialog-state dependent language model.

35. The system of claim 34, wherein the instructions are provided to the large vocabulary continuous speech recognizer from a general-task language model to generate the second hypothesis result.

36. The system of claim 32, wherein the instructions are provided to the dialog manager to implement at least one of a plurality of dialog strategies to further improve accuracy and enhance dialog performance.

37. The spoken dialog system of claim 32, wherein the instructions are provided to a grammar selector to select one of the plurality of dialog-state dependent sub-grammars.

38. The spoken dialog system of claim 32, wherein the instructions are provided from the dialog manager to the grammar selector to select the general-purpose grammar that contains patterns of general user responses.

39. The spoken dialog system of claim 32, wherein each of the plurality of dialog-state dependent sub-grammars is specific to at least one defined task.

* * * * *